(12) United States Patent
Kimball et al.

(10) Patent No.: US 7,994,657 B2
(45) Date of Patent: Aug. 9, 2011

(54) MODULAR SYSTEM FOR UNATTENDED ENERGY GENERATION AND STORAGE

(75) Inventors: Jonathan W. Kimball, Mahomet, IL (US); Philip T. Krein, Champaign, IL (US); Nicholas D. Benavides, Champaign, IL (US)

(73) Assignee: SolarBridge Technologies, Inc., Austin, TX (US)

( * ) Notice: Subject to any disclaimer, the term of this patent is extended or adjusted under 35 U.S.C. 154(b) by 457 days.

(21) Appl. No.: 11/615,074

(22) Filed: Dec. 22, 2006

(65) Prior Publication Data

US 2008/0150484 A1  Jun. 26, 2008

(51) Int. Cl.
    *H02J 1/00*   (2006.01)
(52) U.S. Cl. ......................................................... 307/82
(58) Field of Classification Search .................. 307/82
    See application file for complete search history.

(56) References Cited

U.S. PATENT DOCUMENTS

| | | | |
|---|---|---|---|
| 4,649,287 A * | 3/1987 | Nola | 307/31 |
| 5,710,504 A | 1/1998 | Pascual et al. | |
| 6,489,753 B1 * | 12/2002 | Patterson | 320/162 |
| 6,614,132 B2 * | 9/2003 | Hockney et al. | 307/43 |
| 6,882,063 B2 * | 4/2005 | Droppo et al. | 307/82 |
| 6,914,418 B2 * | 7/2005 | Sung | 320/140 |
| 6,995,482 B2 | 2/2006 | Midya et al. | |
| 7,030,512 B2 | 4/2006 | Krein | |
| 7,126,312 B2 * | 10/2006 | Moore | 320/157 |
| 7,663,342 B2 | 2/2010 | Kimball et al. | |
| 2006/0029846 A1 * | 2/2006 | Konoto et al. | 429/23 |
| 2007/0190369 A1 * | 8/2007 | Leach et al. | 429/9 |
| 2009/0146634 A1 | 6/2009 | Audy | |
| 2009/0296348 A1 | 12/2009 | Russell et al. | |

OTHER PUBLICATIONS

Napoli, et al., "Multiple-Input DC-DC Power Converter for Power-Flow Management in Hybrid Vehicles," 2002, 1578-1585, Conf. Rec. IEEE Industry Applications Soc. Annual Meeting.

Nikraz et al., "Digital Control of a Voltage Source Inverter in Photovoltaic Applications," 2004, 3266-3271, 2004 35th Annual IEEE Power Electronics Specialists Conference, Aachen Germany.

Kimball et al., Hysteresis and Delta Modulation Control of Converters Using Sensorless Current Mode, IEEE Transactions on Power Electronics, Jul. 2006, 5 pages, vol. 21, No. 4.

Midya et al., Sensorless Current Mode Control—An Observer-based Technique for DC-DC Converters, IEEE Transactions on Power Electronics, Jul. 2001, 4 pages, vol. 16, No. 4.

* cited by examiner

*Primary Examiner* — Robert L. Deberadinis
(74) *Attorney, Agent, or Firm* — Barnes & Thornburg LLP

(57) ABSTRACT

An apparatus and method for supplying energy to a load includes an energy recharge unit, an energy storage unit, an energy converter connected to the energy recharge unit, the energy converter being capable of transferring energy at a power level from the energy recharge unit to an output node, the power level being determined by a power transfer controller, and a bi-directional energy converter connected to the energy storage unit and to the output node. The bi-directional energy converter is capable of converting energy of varying voltages from the energy storage unit to energy of varying current levels to supplement the transferred energy with energy from the energy storage unit so as to maintain a constant voltage on the output node. The bi-directional energy converter is capable of converting the transferred energy to provide charging energy to the energy storage unit when the transferred energy exceeds a demand level of the load while maintaining the constant voltage at the output node.

41 Claims, 5 Drawing Sheets

MODULAR SYSTEM FOR UNATTENDED ENERGY GENERATION AND STORAGE

GOVERNMENT RIGHTS

This invention was made with government support under Contract No. H92222-06-C-0002 awarded by the Department of Defense. The U.S. government has certain rights in the invention.

FIELD

The invention relates, generally, to energy generation and storage systems and, more particularly, to a modular system for unattended energy generation and storage.

BACKGROUND

Remote sensors, isolated communication devices, distributed wireless networks, and a host of other unattended electrically-operated systems typically require for operation minimum levels of electrical energy. These unattended electrically-operated systems are generally unreachable by conventional electric power or utility grids. As such, alternative energy or power sources such as, for example, solar energy, wind energy, and geothermal energy, have increasingly been relied upon to supply their required electrical energy.

While a few of these unattended electrically-operated systems are geographically positioned to benefit from regular access and routine maintenance, others may be unsuitable for maintenance either because of difficult access, highly distributed arrangements, or excessive costs. In a variety of applications, limits on maintenance reflect a vast installation. Consider, for example, a border security application in which thousands of sensors are arrayed along hundreds of miles of frontier. In principle, an access road can be built and regular maintenance can be scheduled. In practice, there may be sections in which road access is problematic and the sensor array may be so vast that dedicated maintenance crews may have to be assigned continuously.

Another example is rural broadband access to the Internet or World Wide Web (WWW), in which one approach is a dispersed array of pole-mounted repeaters. If these repeaters can be set up with an "install and forget" strategy, service providers can substantially function without dedicated maintenance crews.

These unattended electrically-operated systems typically utilize energy storage devices or units, to maintain power availability at night, to help maintain operation through intervals of bad weather, and to allow the electrical load to draw power in short-term bursts that might exceed the delivery capability of their energy recharge unit generation or recharge units. Moreover, these unattended electrically-operated systems generally need power conversion and regulation to deliver reliable, consistent power independent of conditions on the energy recharge units or in the storage units.

In solar applications, conventional remote power systems use combinations of solar panels for energy recharge units and rechargeable batteries for energy storage units. Typically, batteries are connected directly to an output, while the solar panels are connected either through a diode or through a switching power converter. The direct use of batteries typically limits the degree of output regulation and does not provide for the longest possible life of these unattended electrically-operated systems. Thus, the battery terminals serve as the direct power output, in which case the only protection is a fuse. As such, the quality of output regulation is determined entirely by the battery and will follow wide tolerances.

These unattended systems typically lack reliability as battery charging processes are not properly managed. Overcharge and undercharge conditions can occur, especially during long periods of cloudy weather. Battery life is relatively limited as a result. If a short circuit blows a fuse, the system will be down until serviced. Multiple battery units may be interconnected, but there is no control mechanism for load sharing or balancing. Further, multiple battery units may be connected to a single output in a modular fashion, and protection and interaction between and among the batteries are not adequate. Thus, these unattended systems need to protect themselves as well as their batteries against output short circuits and other external faults.

In some unattended systems, either the energy recharge unit or the rechargeable storage unit is connected directly to a dc bus, and the other unit is connected through a dc-dc converter. As such, only one dc-dc converter is utilized while having independent control of the energy recharge unit and the rechargeable storage unit regardless of the serviced load. This arrangement supports an improved integration of recharge and storage over the basic solar panel and battery interconnections, but still does not resolve regulation or protection issues.

In other unattended systems, the energy recharge unit charges the storage unit, which then charges a capacitor, which is then switched into the load. In this arrangement, power flow from the energy recharge unit to the load goes through a series of device connections: the energy recharge unit, the storage unit, the capacitor, and then the load. This sequence of operations can result in extra power loss, especially during intervals in which the power from the energy recharge unit is well-matched to the load.

Therefore, a need exists for a modular system for unattended energy generation and storage that overcomes the problems noted above and others previously experienced for addressing issues of regulation, protection, interconnection, or modularity. These and other needs will become apparent to those of skill in the art after reading the present specification.

SUMMARY

The foregoing problems are solved and a technical advance is achieved by the present invention. Articles of manufacture and systems consistent with the present invention provide an apparatus or modular system for unattended energy generation and storage for supplying energy to a load. The apparatus includes an energy recharge unit, an energy storage unit, an energy converter connected to the energy recharge unit, the energy converter being capable of transferring energy at a power level from the energy recharge unit to an output node, the power level being determined by a power transfer controller, and a bi-directional energy converter connected to the energy storage unit and to the output node. The bi-directional energy converter is capable of converting energy of varying voltages from the energy storage unit to energy of varying current levels to supplement the transferred energy with energy from the energy storage unit so as to maintain a constant voltage on the output node. The bi-directional energy converter is capable of converting the transferred energy to provide charging energy to the energy storage unit when the transferred energy exceeds a demand level of the load while maintaining the constant voltage at the output node.

Articles of manufacture consistent with the present invention also provide a method of providing energy to a load from a power supply system. The power supply system includes an energy recharge unit, an energy converter with its input connected to the energy recharge unit and its output connected to an output node and coupled to a power transfer controller, a rechargeable energy storage unit, a bi-directional energy converter with its input connected to the rechargeable energy storage unit and its output connected to the output node, the output node being connected to an input of the load. The method exposes the energy recharge unit to a corresponding energy source so as to produce electric energy, determines via the power transfer controller whether a power level of the produced electric energy is above a predetermined power threshold in order to activate the energy converter, converts the produced electric energy by the energy converter and delivering the converted electric energy to the load in order to meet at least part of a demand level of the load, monitors a voltage at the output node. The method further converts energy stored in the energy storage unit by the bi-directional energy converter to supplement the delivery of the converted produced energy to the load so as to maintain the output node voltage at a predetermined voltage level, and converts the transferred energy to provide charging energy to the energy storage unit when the transferred energy exceeds a demand level of the load while maintaining the predetermined voltage level at the output node.

Other systems, apparatus, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE DRAWINGS

Reference will now be made in detail to an implementation consistent with the present invention as illustrated in the accompanying drawings. Wherever possible, the same reference numbers will be used throughout the drawings and the following description to refer to the same or like parts.

Figure 1:
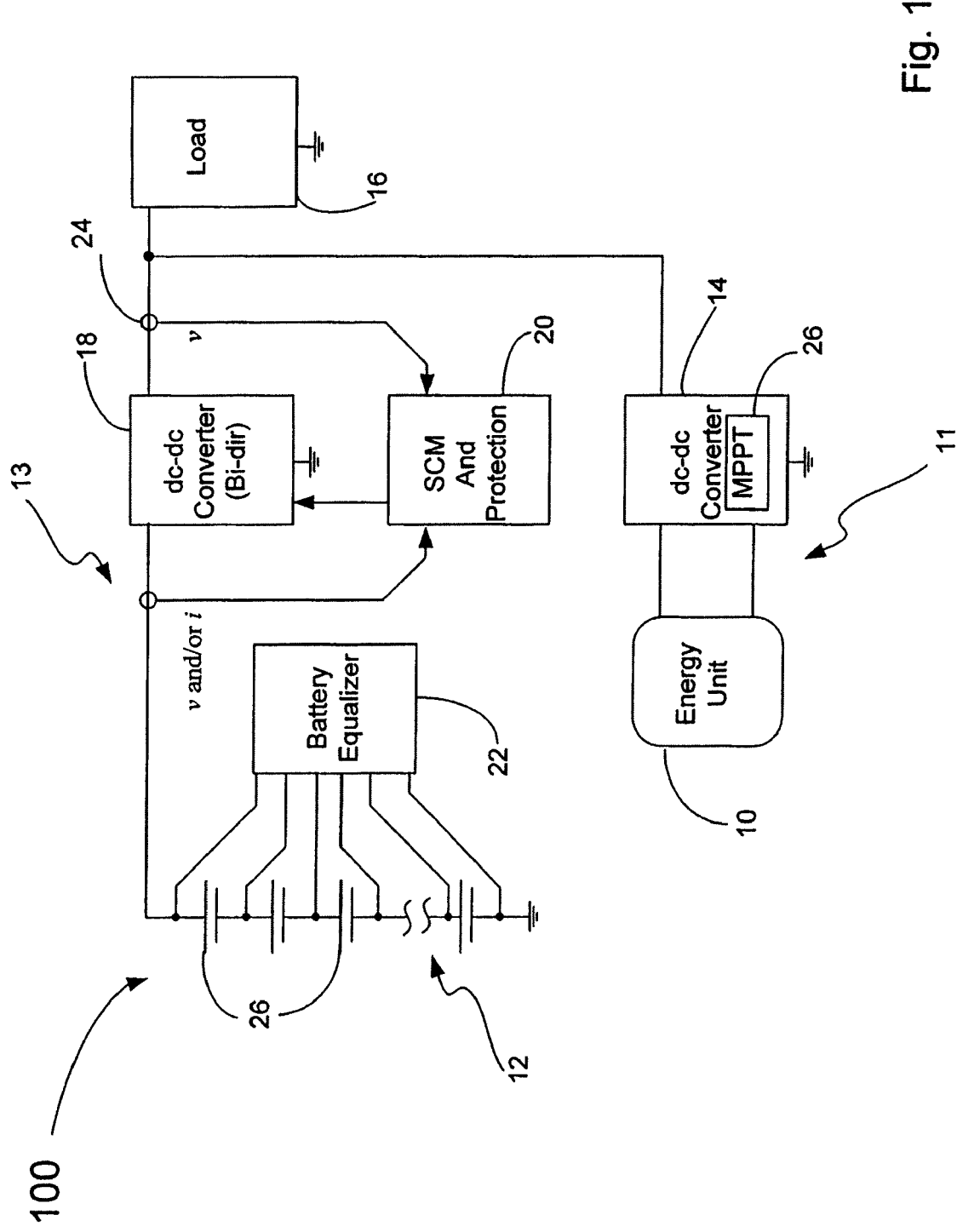
FIG. 1 is a schematic diagram illustrating one embodiment of a modular unattended system for energy generation and storage consistent with the present invention.

FIG. 1 depicts one embodiment of a modular system for unattended energy generation and storage or power supply apparatus 100 consistent with the present invention. The power supply apparatus 100 is a modular system that comprises an energy recharge device or unit 10 suitable for long-term operation and expected to provide variable energy, an energy storage device or unit 12 which is charged and recharged by the energy recharge unit 10, a switching power conversion circuit 14 that draws power when activated from the energy recharge unit 10 in a manner that addresses the needs of a load 16. The switching power conversion circuit 14 will be hereafter referred to as the recharge unit or source converter 14. The power supply apparatus 100 further comprises another switching power conversion circuit 18 that manages the energy storage unit 12 and maintains an output suitable for the variable or arbitrary electrical load 16. The switching power conversion circuit 18 will be hereafter referred to as the storage converter 18.

The power supply apparatus 100 is configured to enable energy delivery to the load 16 from the energy recharge unit 10 while also providing energy to the energy storage unit 12 so as to augment, if necessary, the energy stored in the energy storage unit 12 when sufficient recharge unit energy is available. The power supply apparatus 100 is also configured to enable energy delivery to the load 16 from the energy recharge unit 10 and/or from the energy storage unit 12 when the energy recharge unit 10 is unable to meet the energy needs of the load 16. The power supply apparatus 100 also prevents energy delivery to the load 16 when the charge level of the energy storage unit 12 falls below a minimum voltage threshold level so that all of the energy generated by the energy recharge unit 10 is supplied or made available to the energy storage unit 12 until the voltage of the energy storage unit 12 reaches this minimum voltage threshold level at which the storage converter 28 will operate at a minimum desired energy conversion efficiency level. As such, the energy recharge unit 10 can build up the amount of energy in the energy storage unit 12 first and then to deliver and maintain delivery of energy to the load 16 as well as to continue building up and maintaining energy in the storage energy unit 12 during periods when the energy recharge unit 10 is producing enough energy to do so.

The energy recharge unit 10 may be any kind of power or energy generating system, such as for example solar panel, solar cell, fuel cell, wind generator, rotary generator, etc. For the purposes of the present invention, the energy recharge unit 10 is a solar panel. One important feature is that the energy recharge unit 10 is configured to be controlled to maximize its performance and longevity. In the case of a solar or wind recharge unit, the control draws maximum available power whenever power is available and useful. In the case of a fuel cell or rotary generator, the control acts to maintain operation at an optimum power point, selected for the specific technology. The preferred application is an unattended long-term power supply, so those energy systems that require substantially no maintenance are most suitable. These would include solar photovoltaic panels, wind generators, small water wheels, or devices able to extract energy from the immediate surroundings. Almost all plausible energy recharge units 10 for this purpose have an identified optimum operating condition. As such, the energy recharge unit 10 uses a switching power converter controlled to enforce this optimum. This is intended to make the operation of the energy recharge unit 10 nearly independent from those of the load 16 and the energy storage unit 12.

In the preferred embodiment, the energy storage unit 12 is based on energy storage elements 26 such as ultracapacitors. Among electrical and electrochemical storage devices, ultracapacitors 26 are known to provide the highest number of charge and discharge cycles and to have long life as well. Other energy accumulators, especially secondary batteries but also devices such as flywheels or other rechargeable mechanical devices are applicable. Ultracapacitors 26 or batteries or other rechargeable elements may be used in series strings owing to their relatively low terminal voltages. To ensure long life, the individual storage elements in the series string need to be matched in voltage. Known balancing technology provides this function, which in turn assures the longest possible life. In ultracapacitors and certain battery types, notably lithium-ion rechargeable cells, life is further extended by limiting the charge voltage. Balancing technology allows the voltage to be set to any desired value, and can maintain balance even if a decreased voltage is desired. In the unattended power supply apparatus 100, the energy storage unit 12 may be controlled to permit operation even when the energy recharge unit 10 is unavailable, and is protected against both under-voltage and over-voltage to prevent failures.

The load 16 can be any kind of electric load, which requires electric power at a rate or magnitude that does not exceed the capacities of the energy storage unit 12 and the energy recharge unit 10 over time, or for which periods of nonuse during shortages of such capacities can be tolerated before the energy recharge unit 10 is re-energized and self-started. The energy recharge unit 10 and the energy storage unit 12 need to be suitable for the load 16 that may require either fairly steady or intermittent current. Moreover, the energy storage unit 12 needs to be able to accumulate enough energy capacity to power the load 16 for some periods of time during which the energy recharge unit 10 is incapable of doing so, for example, during the dark of night or during cloudy weather when the energy recharge unit 10 is a solar panel.

Now referring back to FIG. 1, the energy recharge unit 10 is connected to the source converter 14 such that energy or power generated or otherwise produced by the energy recharge unit 10 flows through the source converter 14 to the load 16 and to the storage converter 18 via the output node 24. The source converter 14 is a dc-dc switching power converter, and preferably a boost type dc-dc converter. The source converter 14 incorporates a maximum power point tracker (MPPT) or power controller 26, which serves to insure that the energy recharge unit 10 generates maximum power without regard to voltage at output node 24 or other conditions. When the energy recharge unit 10 is a solar panel, the source converter 14 (and its MPPT controller 26) functions only when solar energy is available, such as during daylight hours. That is, an internal processor (not shown) of the source converter 14 does not consume energy unless solar energy is available. This operational feature of the source converter 14 is accomplished by supplying the recharge unit converter controls from the panel of the energy recharge unit 10.

By incorporating the MPPT controller 26, the source converter 14 becomes a variable dc-dc converter that may use a control algorithm to force the terminals of the photovoltaic panel to an impedance that produces the maximum power out of the panel of the energy recharge unit 10. The MPPT controller 26 adjusts the panel operating point to extract maximum power on a moment-by-moment basis. This MPPT controller 26 may act entirely based on panel terminal characteristics so as to function irrespectively of the voltage at output node 24. As such, the source converter 14 does not disrupt voltage level or interfere with voltage regulation action elsewhere in the power supply apparatus 100. Many MPPT methods can be used, such as ripple correlation control, perturb-and-observe approaches or constant-voltage-fraction approaches.

The MPPT controller 26 is also configured to enforce a voltage limit and permit an external digital command to shut it down. Without such a limit or command, excess solar power may continue to be delivered from the energy recharge unit 10 even when the load 16 is light and the storage energy unit 12 is at full capacity. In this situation, solar energy is not needed, and there is a potential for overcharging the energy storage unit 12 or delivering excessive voltage at the output node 24. Moreover, when the produced energy falls below a predetermined energy level, the MPPT controller deactivates the source converter 14. Power tracking subject to a voltage limit and shutdown command is a known practice but has not been used previously with a separate parallel converter, such as the storage converter 18, which manages a different function.

As stated earlier, the energy storage unit 12 is connected to the output node 24 through the storage converter 18. The storage converter 18 is a bi-directional dc-dc boost converter configured to deliver a consistent or approximately constant output voltage level on the output node 24, regardless of its input voltage level. That is, even if the input voltage to the storage converter 18 varies, the output voltage of the storage converter 18 on the output node 24, which is supplied to the load 16, preferably remains approximately constant, which may be required by the load 16, especially if the load 16 includes a microprocessor or other logic controller that typically requires such a constant voltage input to avoid inconsistent or incorrect operation that may be caused by voltage fluctuations.

Typically, dc-dc voltage converters by nature have different conversion efficiency characteristics for different input voltages. At a low input voltage, the storage converter 18 may be so inefficient that it may drain all the power available from the energy storage unit 12 at a rate faster than the energy storage unit 12 and the energy recharge unit 10 can supply and still not be able to deliver the required constant voltage on the output node 24. In that condition, the power supply apparatus 100 may not power the load 16. Therefore, the storage converter 18 is activated only when its input voltage is high enough to operate efficiently and that the energy available from the energy storage unit 12 is sufficient for the storage converter 18 to deliver the required energy at the required constant voltage on output node 24 to operate the load 16. As such, the storage converter 18 is activated or controlled using a sensorless current mode (SCM) controller 20, with its primary objective being output voltage regulation. The SCM controller 20 is connected to the output of the energy storage unit 12 and to the output of the storage converter 18. Alternately, the SCM controller 20, which may include a processor programmed with operational instructions, may be incorporated into the storage converter 18.

In SCM control, an inductor current is reconstructed from voltage information. The inductor voltage in a dc-dc converter is typically a substantially larger signal than an output of a current sensor and its range does not change as a function of loading. In its simplest form, the SCM approach reconstructs the inductor current directly by integrating the inductor voltage. Alternately, current limiting can be enforced by means of a separate current sensor. As such, current can be limited from the energy storage unit 12 to limit an energy flow when the output node 24 is short-circuited or overloaded. Other control methods, such as voltage-mode or current-mode controls, can be used if they are properly designed to reject energy variations, although SCM has known advantages based on noise rejection and wide operating range.

Using the SCM controller 20, the storage converter 18 can be controlled to produce a substantially constant voltage at the output node 24. In effect, the storage converter 18 can deliver whatever current is needed to maintain the substantially constant voltage. If the current of the energy recharge unit 10 exceeds the current amount required by the load 16, the storage converter 18 takes the excess and acts to deliver it to the energy storage unit 12 at the actual capacitor voltage level. If the current of the energy recharge unit 10 is insufficient for the load 16, the storage converter 18 acts to take current from the energy storage unit 12 and to maintain the load with constant voltage output. Thus, the storage converter 18 manages the current to take on whatever value is needed (positive or negative) at any given moment to maintain the constant voltage at output node 24 and support the load 16.

Moreover, the SCM controller 20 can monitor energy buildup in the energy storage unit 12 and detects when the voltage in the energy storage unit 12 reaches or exceeds a minimum threshold level. More specifically, the SCM controller 20 may prevent any energy generated by the energy recharge unit 10 and any energy in energy storage unit 12 from being delivered to the load 16 until such time as the energy storage unit 12 has reached a minimum threshold of energy storage or a minimum charge level.

As stated above, in FIG. 1 the energy storage unit 12 uses the ultracapacitors 26, which can deliver extreme cycle counts, 100,000 or more, thus supporting decades of daily or even more frequent cycles. These ultracapacitors 26 have limited voltage ratings, typically 2.3 to 2.7 V each, so they are used in series combinations in most storage applications. In series combinations, a charge imbalance is reflected as a voltage imbalance, and it is imperative to make sure the highest voltage in the series string stays below the operating limit. Furthermore, life extension can be obtained if an even lower voltage limit is enforced. Similar limitations based on voltage apply to batteries, which can be used in place of ultracapacitors 26 with only minor circuit modifications.

In the embodiment of FIG. 1, the energy storage unit 12 is coupled to an equalizer 22. The equalizer 22 can guarantee that each of the ultracapacitors 26 has a corresponding voltage that is a correct fraction of the total string voltage. Thus, if there are 5 ultracapacitors 26 in series and the total voltage is 10.0 V, then each individual ultracapacitor 26 is within a few millivolts of 2.0 V. The use of the equalizer 22 enables the monitoring and enforcement of capacitor voltage limits and the management of the energy storage unit 12. The inclusion of the equalizer 22, especially to facilitate reduced-voltage operation, is an advantageous aspect of the invention.

As shown in FIG. 1, the power supply apparatus 100 can be subdivided into two subsystems 11 and 13 and the load 16. Namely, an energy recharge unit or recharge subsystem 11 which includes the energy recharge unit 10 and the source converter 14 with its MPPT controller 26, and an energy storage subsystem 13 which includes energy storage unit 12, the equalizer 22 and the storage converter 18 with its SCM controller 20.

An advantageous feature of the power supply apparatus 100 is that the system-level power converter control, which includes controls incorporated into the source converter 14 and the storage converter 18, decouples the action of the individual subsystems 11 and 13. This allows the two subsystems 11 and 13 to interact in a simple and parallel manner without introducing control challenges. The basic action is that the energy recharge unit 10 is controlled for power flow, the output node 24 is controlled for fixed voltage, and the current to and from the energy storage unit 12 is controlled to make up any differences.

As both the energy recharge subsystem 11 and the energy storage subsystem 13 supply the load 16 in parallel, the solar energy produced does not go through multiple power processing stages on its way to the load 16. Moreover, as the output node 24 need not be connected directly either to the energy storage unit 12 or to the energy recharge unit 10, each of the intervening dc-dc converters 14 and 18 manages the needs of the corresponding subsystems 11 and 13 while delivering regulated output power to the output node 24 that serves the load 16. This arrangement of the power supply apparatus 100 can be termed a "virtual bus" structure.

Figure 2A:
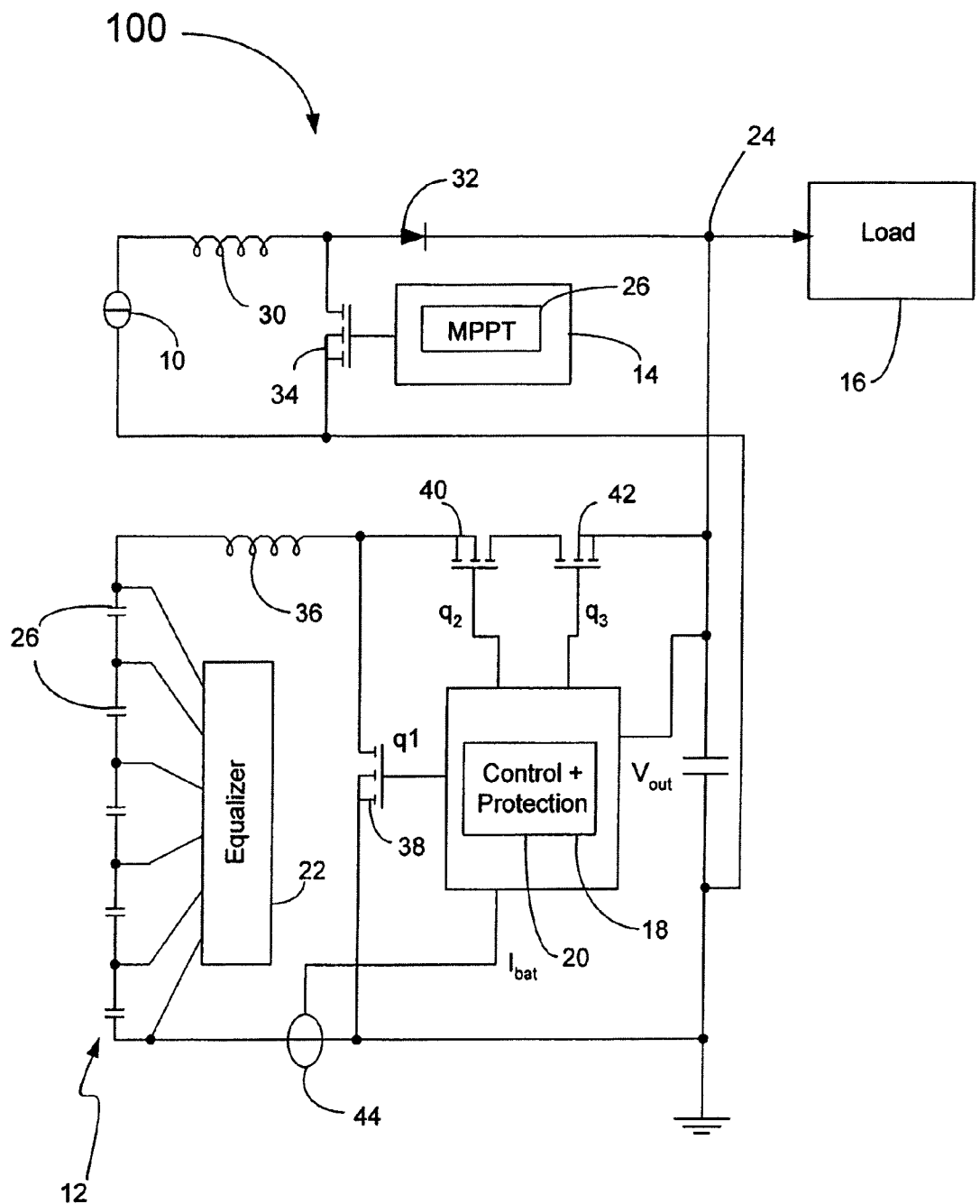
FIGS. 2A and B are schematic diagrams illustrating the modular unattended system for energy generation and storage of FIG. 1 with protection elements consistent with the present invention.

Now referring to FIGS. 2A and B, another embodiment of the power supply apparatus 100 of FIG. 1 is illustrated with protection elements consistent with the present invention. As shown, the subsystem 11 now includes an inductor element 30 connected at the output of the energy recharge unit 10, a unidirectional element 32, such as a diode, connected in series between the inductor element 30 and the load 16, and a switching element $q_4$ 34 connected in parallel with the energy recharge unit 10 and the inductor 30. The switching element $q_4$ 34, which can also be referred as the recharge unit switch $q_4$ 34, is coupled for switching operations to the source converter 14.

Figure 2B:
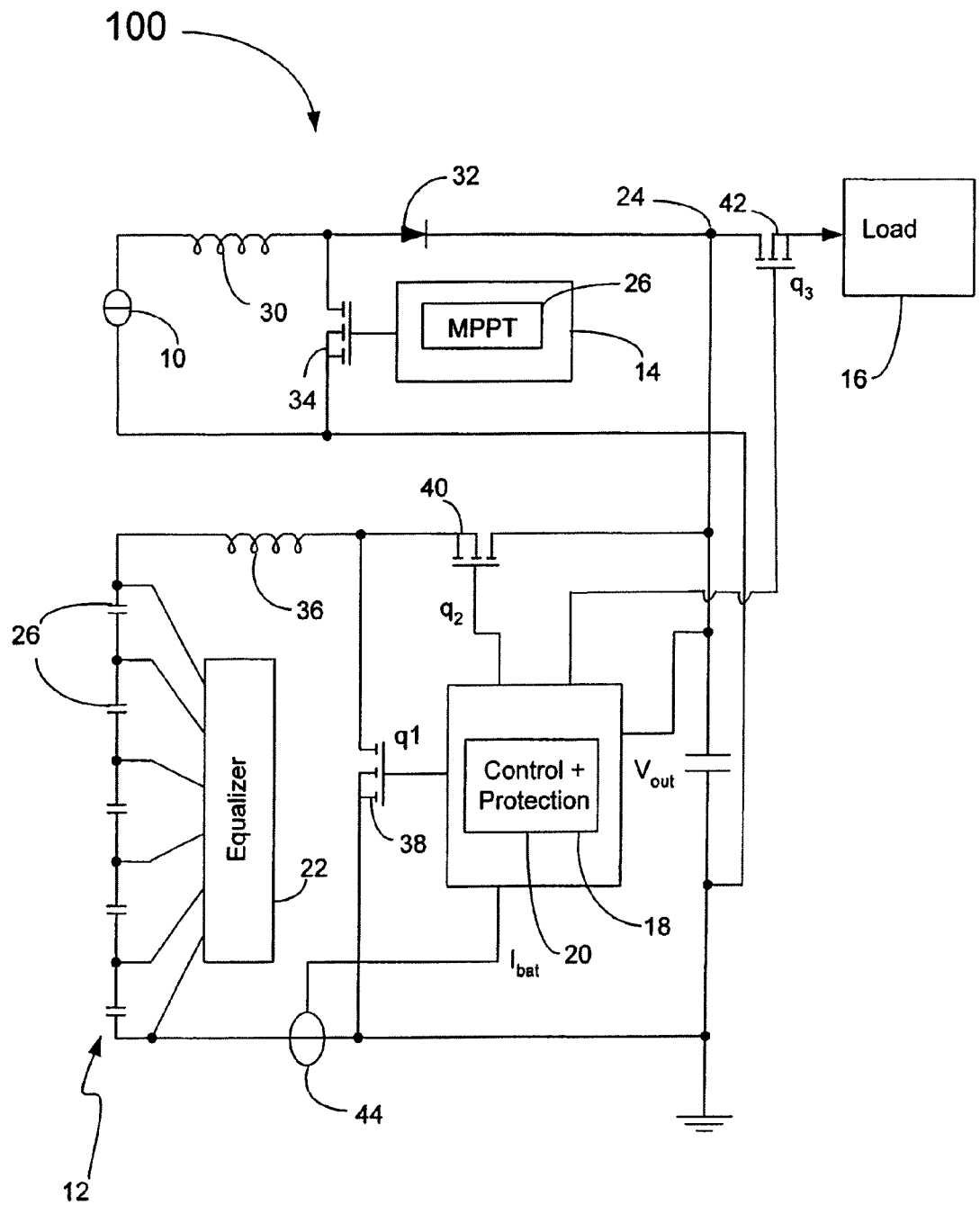

As shown in FIGS. 2A and B, the subsystem 13 includes an inductor element 36 connected at the output of the storage unit 12, and a switching element $q_1$ 38 connected in parallel with the storage rechargeable unit 12 and the inductor element 36. The switching element $q_1$ 38 may be a field-effect transistor (FET) or metal-oxide semiconductor FET (MOSFET). The recharge unit switch $q_1$ 38, is coupled for switching operations to the storage converter 18. Additionally, as shown in FIG. 2A two other switching elements $q_2$ 40 and $q_3$ 42 are connected in series between the inductor element 36 and the output node 24, and coupled for switching operations to the storage converter 18. The switching elements $q_2$ 40 and $q_3$ 42 may be field-effect transistors (FET) or metal-oxide semiconductor FETs (MOSFET). Alternately, the switching elements $q_3$ 42 may be positioned between the output node 24 and the load 16, as shown in FIG. 2B. Moreover, a current sensor 44 is used to supply a value of a current $I_{bat}$ of the energy storage unit 12 to the storage converter 18.

Figure 3:
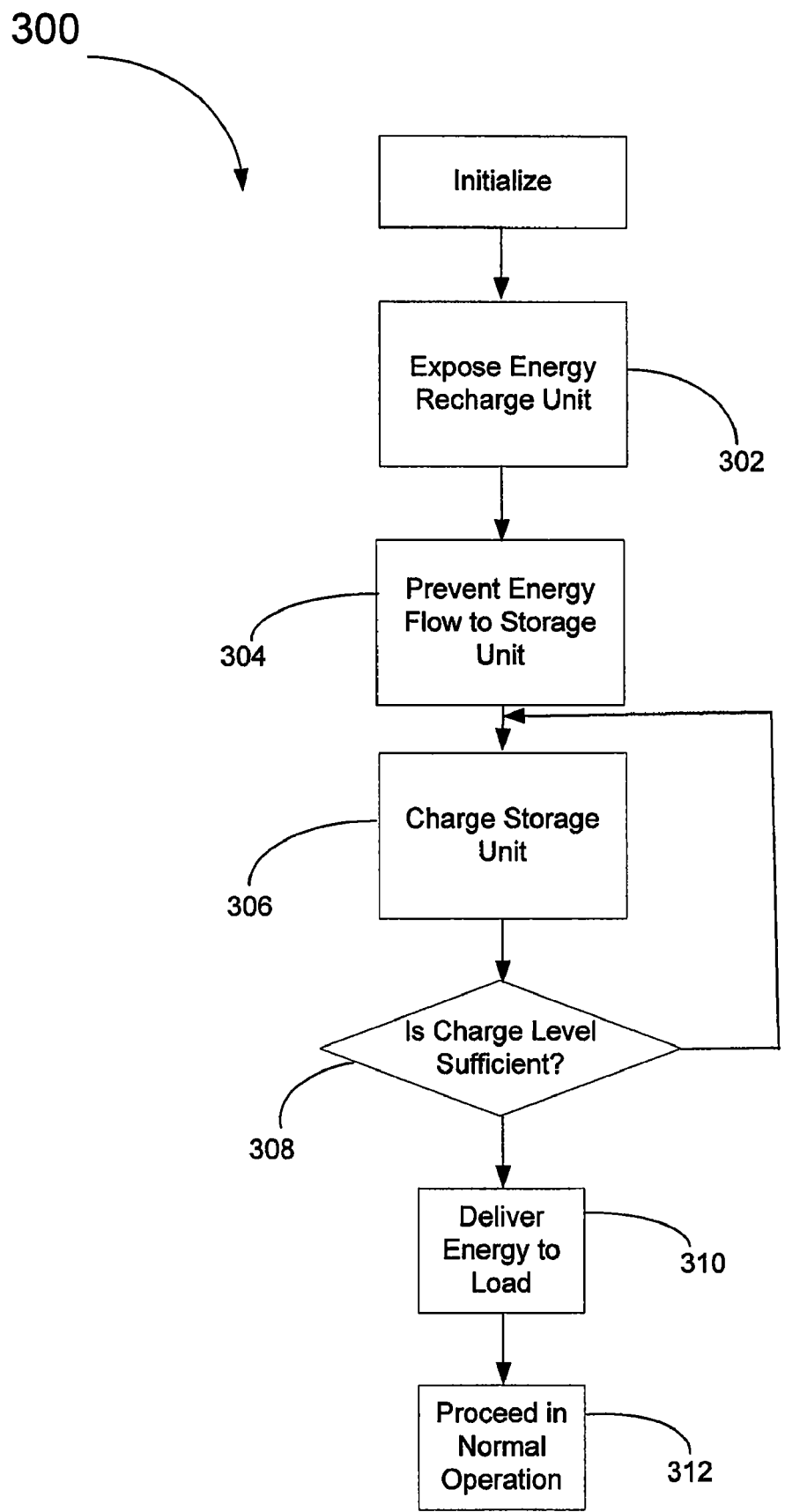
FIG. 3 is a flow chart illustrating a method for an initial start-up of the modular unattended system for energy generation and storage of FIG. 1 consistent with the present invention.

Now referring to FIG. 3, a flow chart 300 illustrates a method for an initial start-up of the power supply apparatus 100 of FIG. 1 consistent with the present invention. The energy storage converter 18 is configured with its SCM controller 20 to manage the start up procedure. At an initial start-up of the power supply apparatus 100, the energy recharge unit 10 being a solar cell is exposed to available sunlight in step 302, and the energy storage unit 12 is in this initial condition has no stored energy charge or only a very low amount of stored energy or charge. Upon initial start up of the power supply apparatus 100 in this configuration, the storage converter 18 prevents any energy converted by the source converter 14 from being delivered to the load 16, at step 304. That is, the storage converter 18 ensures that all of the energy generated by the energy recharge unit 10 is flowing to the energy storage unit 12, at step 306. The storage converter 18 manages this power flow and prevents excessive starting current by means of a hardware limit on the duty ratio of recharge unit switch $q_1$ 38. Once the energy storage unit 12 reaches a minimum threshold for its energy level, at step 308, the storage converter 18 allows the energy generated by the energy recharge unit 10 to be delivered to the load 16, at step 310, while a remainder of the energy generated, if any, is supplied to the energy storage unit 12 so that the energy level in the energy storage unit 12 continues to increase. That is, once the voltage of the energy storage unit 12 has exceeded the minimum allowed threshold (minimum operating energy level), then the power supply apparatus 100 may supply the load 16 (i.e. enter normal operation), at step 312. Moreover, as stated above during normal operation the energy storage unit 12 can supply the energy required by the load 16 when the energy recharge unit 10 cannot generate sufficient energy to operate the load 16.

Moreover, when the energy storage unit 12 is discharged to below the minimum allowed operating energy level, that is, its terminal voltage is low, The recharge unit switch $q_1$ 38 is turned off and a diode (not shown) allows energy to flow into but not out of the energy storage unit 12. Conversely, when the energy storage unit 12 is completely charged (maximum allowed operating energy level), that is, its terminal voltage is high, the storage converter 18 sends a disable signal to shut off the source converter 14. In this circuit condition, the switching element $q_2$ 40 is also turned off and the diode (not shown) allows only energy to flow out of but not into the energy storage unit 12.

Figure 4:
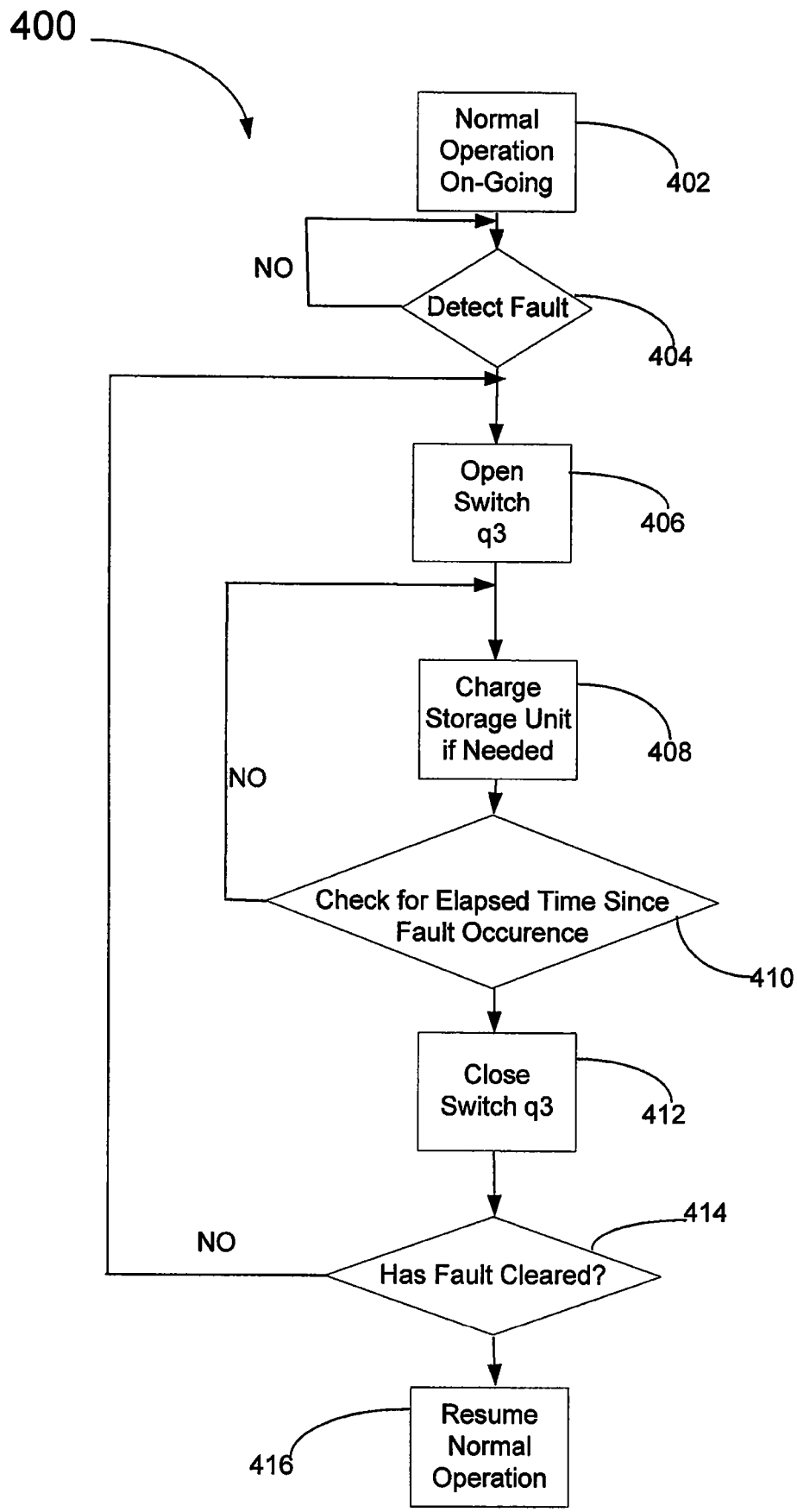
FIG. 4 is a flow chart illustrating a method for detecting and mitigating a fault disturbing an on-going operation of the modular unattended system for energy generation and storage of FIG. 1 consistent with the present invention.

Now referring to FIG. 4, a flow chart 400 illustrates a method for detecting and mitigating a fault disturbing an on-going operation of the power supply apparatus 100 of FIG. 1 consistent with the present invention. As shown in FIGS. 2A and B, the output protection switching element $q_3$ 42, which may be provided in alternate positions, allows the energy storage subsystem 13 to be completely disconnected if a problem occurs. This is an unusual arrangement in a dc-dc converter and may be a unique aspect in this particular application. Further, an automatic recovery procedure programmed in the processor of the storage converter 18 to restore power if a short-term output problem appears during normal operation, at step 402, is described below.

If a short circuit is detected occurring at the output node 24, at step 404, the protection switch $q_3$ 42 disconnects immediately, at step 406. Switch ratings are chosen so the protection switch $q_3$ 42 can interrupt a maximum short-circuit current. As such, the energy stored in the ultracapacitors 26 will not dissipate into the short circuit. When this switch q3 42 is open the storage subsystem 13 can charge when sufficient voltage is available, at step 408, because a reverse parallel diode (not shown) connected with switch $q_3$ 42 permits inflow but not outflow. The storage subsystem 13 may not discharge until a fault recovery sequence is completed. The protection switch q3 42 also opens if the capacitor voltage falls below a lower limit or threshold, indicating possible undercharge so as to protect the energy storage subsystem 13 against total energy loss if a fault occurs. Energy remains available, and allows the power supply system apparatus 100 to recover normal operation immediately when the fault is gone and the energy recharge unit 10 is once again delivering power. After determining if a predetermined amount of time has elapsed, at step 410, and once the fault clears, the storage converter 18 enters a recovery mode. At step 412, the switch $q_3$ 42 is turned on and the storage converter 18 begins providing energy to the output node 24. At step 414, a check is made as to whether the fault is still present. In the affirmative, switch $q_3$ 42 turns off again. Otherwise, the output voltage at output node 24 starts to come up and normal operation resumes, at step 416.

Another advantageous protection feature of the invention is the positioning of the unidirectional element or diode 32 in the recharge unit subsystem 11. This diode 32 is provided at an output of the energy recharge unit 10 to prevent current from flowing toward it. That is, the diode 32 permits current outflow but not inflow toward the energy recharge unit 10. In this embodiment of the power supply apparatus 100, no additional protection switching element is provided between the energy recharge unit or solar panel 10 and the load 16, because solar panels are inherently current limited. That is, a short-circuit current is typically only slightly higher than the rated output current of the power supply apparatus 100. As such, short circuit conditions do not result in excessive current flows, and the source converter 14 and its MPPT controller 26 may not need to be shut-off because as discussed above a separate process programmed in the storage converter 18 manages the recovery process from a short circuit condition.

In summary, the combination of power-based tracking control for the source converter 14 and SCM control for the storage converter 18 is an advantageous feature of the invention. These two controls work together in a highly useful manner. The MPPT controller 26 acts to maximize power from the energy recharge unit 10 no matter what voltage is present at the output node 24. The SCM controller 20 acts to regulate the voltage no matter what the power. As a result, undesired dynamic interactions are avoided. When the energy recharge unit 10 is able to deliver extra power, this power flows into the energy storage unit 12 without any extra intentional effort. When the energy recharge unit 10 is insufficient or absent, energy flows from the energy storage unit 12 to maintain the desired voltage at the output node 24. The two controls can be designed independently, and work together in a manner that is highly beneficial for the modular arrangement of the power supply apparatus 100. The only added aspect needed to avoid undesired interactions is to address the condition when the energy storage unit 12 reaches its "full" state or charge. In this case, extra power input to this modular system is not useful. Under this condition, which is sensed easily by confirming that the energy storage unit 12 has reached its voltage limit, the energy storage converter 18 sends a signal to shut off the source converter 14. The energy recharge unit 10 will not turn back on until its power is again useful to the modular system or power supply apparatus 100. As such, the energy storage unit 12 is managed with both upper and lower voltage limits to prevent overcharge and undercharge. A limited charge range is essential for high reliability. A current limit is enforced both on the energy storage subsystem 11 and at the output node 24. If the output current becomes excessive, then the protection device $q_2$ 40 temporarily shuts off the output.

This control combination is advantageous because it delivers excellent output regulation no matter how power is flowing in the power supply system apparatus 100. Since the power flow is uncertain and highly variable, it is essential that the regulation function be carried out in a manner independent of flows, directions, and other factors. The SCM controller 20 is able to carry out its function even when short-term load peaks are applied to the power supply system apparatus 100. An advantage is that highly variable loads that require intermittent power can be handled without special problems with this power supply system apparatus 100. Loads with consistent, constant power needs are also handled without trouble.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:
1. An apparatus for supplying energy to a load, comprising:
an energy recharge unit;
an energy storage unit;
an energy converter connected to said energy recharge unit, said energy converter being capable of transferring energy at a power level from said energy recharge unit to an output node at a predetermined voltage, said power level being determined by a power transfer controller; and a bi-directional energy converter connected to said energy storage unit and to said output node;

a sensorless current mode (SCM) controller connected to the energy storage unit to receive an output of the energy storage, to the output node to receive an output of the bi-directional energy converter, and to the bi-directional energy converter, the SCM controller being configured to control the operation of the bi-directional energy converter, based on the output of the energy storage and the output of the bi-directional energy converter, to maintain the voltage of the output node at the predetermined voltage by:

(i) converting energy of varying voltages from said energy storage unit to energy of varying current levels at the predetermined voltage to supplement said transferred energy with energy from said energy storage unit, (ii) converting said transferred energy to provide charging energy to said energy storage unit when said transferred energy exceeds a demand level of said load, and (iii) deactivating the bi-directional energy converter in response to the transferred energy falling below the demand level of said load and a charge level of the energy storage unit falling below a predetermined lower charge threshold.

2. The apparatus of claim 1, wherein said bi-directional energy converter interrupts said charging of said energy storage unit when a charge level of said energy storage unit reaches a predetermined upper charge threshold.

3. The apparatus of claim 1, wherein said bi-directional energy converter maintains said constant voltage at said output node under varying input voltages.

4. The apparatus of claim 1, wherein said power transfer controller determines said power level of said transferred energy by optimizing said produced electric energy by adjusting an operating point of said energy recharge unit.

5. The apparatus of claim 1, wherein said energy converter is deactivated when said produced energy falls below a predetermined energy level.

6. The apparatus according to claim 1, further comprising a protection element that serves to disconnect said energy storage unit when a fault is detected at said output node.

7. The apparatus according to claim 6, wherein said protection element reconnects said energy storage unit when said fault has been cleared, and said bi-directional energy converter resumes supplementing said transferred energy with energy from said energy recharge unit.

8. The apparatus according to claim 1, further comprising a unidirectional conducting element provided at an output of said energy recharge unit to prevent current from flowing toward said energy recharge unit.

9. The apparatus according to claim 1, wherein said energy storage unit comprises a plurality of rechargeable elements with a capability of receiving energy from said energy recharge unit.

10. The apparatus according to claim 9, further comprising an equalizer that serves to ensure a voltage balance and a charge balance among said plurality of rechargeable elements.

11. The apparatus according to claim 9, wherein said plurality of rechargeable elements comprises batteries.

12. The apparatus according to claim 9, wherein said plurality of rechargeable elements comprises capacitors.

13. The apparatus according to claim 12, wherein said capacitors are ultra-capacitors.

14. The apparatus of claim 1, wherein said energy converter is a dc-dc converter.

15. The apparatus of claim 1, wherein said bi-directional energy converter is a dc-dc bi-directional converter.

16. The apparatus of claim 1, wherein said energy recharge unit is one of a solar power unit, a wind power unit, a flywheel power unit, a geothermal power unit and a generator unit.

17. A method of providing energy to a load from a power supply system, said power supply system comprising an energy recharge unit, an energy converter with an input connected to the energy recharge unit and an output connected to an output node and coupled to a power transfer controller, a rechargeable energy storage unit, a bi-directional energy converter with an input connected to said rechargeable energy storage unit and an output connected to said output node, said output node being connected to an input of said load, and a sensorless current mode (SCM) controller with a first input connected to said rechargeable energy storage unit and a second input connected to the output of the bi-directional energy converter, said method comprising:

exposing said energy recharge unit to a corresponding energy source as to produce electric energy;

determining via said power transfer controller whether a power level of said produced electric energy is above a predetermined power threshold in order to activate said energy converter;

converting said produced electric energy by said energy converter and delivering said converted electric energy to said load at a predetermined voltage in order to meet at least part of a demand level of said load;

monitoring a voltage at said output node; and controlling the operation of the bi-directional energy converter with the SCM controller, based on an output of the energy storage unit and an output of the bi-directional energy converter, to maintain the voltage of said output node at the predetermined voltage by:

(i) converting energy stored in said energy storage unit by said bi-directional energy converter to supplement said delivery of said converted produced energy to said load, and (ii) converting said transferred energy to provide charging energy to said energy storage unit when said transferred energy exceeds the demand level of said load, and (iii) deactivating the bi-directional energy converter in response to the transferred energy falling below the demand level of said load and a charge level of the energy storage unit falling below a predetermined lower charge threshold.

18. The method according to claim 17, further comprising: deactivating said energy converter when said power level of said produced electric energy falls below said predetermined power threshold.

19. The method according to claim 17, further comprising: deactivating said energy converter when said demand level of said load falls below a predetermined load threshold and a charge level of said energy storage unit is above a predetermined charge threshold.

20. The method according to claim 17, further comprising: delivering said produced electric energy to said bi-directional energy converter to charge said energy storage unit when a charge level of said energy storage unit is below a predetermined charge upper threshold.

21. The method according to claim 20, further comprising: discontinuing charging said energy storage unit when said charge level of said energy storage unit is at or near said predetermined charge upper threshold.

22. The method according to claim 17, further comprising:
preventing delivery of said converted electric energy to said load when a charge level of said energy storage unit is below a predetermined charge lower threshold;
delivering said produced electric energy to said bi-directional energy converter to charge said energy storage unit until said charge level of said energy storage unit is above said predetermined charge lower threshold; and
resuming delivery said converted electric energy to said load.

23. The method according to claim 17, further comprising:
optimizing said produced electric energy by adjusting an operating point of said energy recharge unit via said power transfer controller.

24. The method according to claim 17, further comprising:
disconnecting said energy storage unit when a fault is detected at said output node.

25. The method of claim 17, wherein said energy recharge unit is one of a solar power unit, a wind power unit, a flywheel power unit, a geothermal power unit and a generator.

26. The method of claim 17, wherein said energy converter is a dc-dc converter.

27. The method of claim 17, wherein said energy recharge unit comprises a plurality of rechargeable elements.

28. The method according to claim 27, wherein said plurality of rechargeable elements comprises batteries.

29. The method according to claim 27, wherein said plurality of rechargeable elements comprises capacitors.

30. The method according to claim 29, wherein said capacitors are ultra-capacitors.

31. The method according to claim 17, further comprising:
balancing a voltage balance and a charge balance of said plurality of rechargeable elements via an equalizer.

32. The method of claim 17, wherein said bi-directional energy converter is a dc-dc bi-directional converter.

33. A computer readable medium comprising instructions which when executed by a computer system causes the computer to implement a method for providing energy to a load from a power apparatus, said power apparatus comprising an energy recharge unit, an energy converter with an input connected to the energy recharge unit and coupled to a power transfer controller, a rechargeable energy storage unit, a bi-directional energy converter with an input connected to said rechargeable energy storage unit, and a sensorless current mode (SCM) controller connected to said rechargeable energy storage unit and to the bi-directional energy converter, said method comprising:
exposing said energy recharge unit to a corresponding energy source so as to produce electric energy;
determining via said power transfer controller whether a power level of said produced electric energy is above a predetermined power threshold in order to activate said energy converter;
converting said produced electric energy by said energy converter and delivering said converted electric energy to said load at a predetermined voltage in order to meet at least part of a demand level of said load;
monitoring a voltage at said output node; and
controlling the operation of the bi-directional energy converter with the SCM controller, based on an output of the energy storage unit and an output of the bi-directional energy converter, to maintain the voltage of said output node at the predetermined voltage by:
(i) converting energy stored in said energy storage unit by said bi-directional energy converter to supplement said delivery of said converted produced energy to said load,
(ii) converting said transferred energy to provide charging energy to said energy storage unit when said transferred energy exceeds the demand level of said load, and
(iii) deactivating the bi-directional energy converter in response to the transferred energy falling below the demand level of said load and a charge level of the energy storage unit falling below a predetermined lower charge threshold.

34. A system for performing a method for providing energy to a load from a power apparatus, said power apparatus comprising an energy recharge unit, an energy converter with an input connected to the energy recharge unit and coupled to a power transfer controller, a rechargeable energy storage unit, a bi-directional energy converter with an input connected to said rechargeable energy storage unit, said energy recharge unit being exposed to a corresponding energy source so as to produce electric energy, the system comprising:
at least one processor programmed to determine via said power transfer controller whether a power level of said produced electric energy is above a predetermined power threshold in order to activate said energy converter, to activate said energy converter to convert said produced electric energy and to deliver said converted electric energy to said load at a predetermined voltage in order to meet at least part of a demand level of said load; and
a sensorless current mode (SCM) controller connected to the rechargeable energy storage unit to receive an output of the energy storage, to the output node to receive an output of the bi-directional energy converter, and to the bi-directional energy converter, the SCM controller being configured to control the operation of the bi-directional energy converter, based on the output of the energy storage and the output of the bi-directional energy converter, to maintain the voltage of said input at the predetermined voltage by:
(i) converting energy stored in said energy storage unit for supplementing said delivery of said converted produced energy to said load
(ii) converting at least part of said transferred energy to provide charging energy to said energy storage unit when said transferred energy exceeds the demand level of said load, and
(iii) deactivating the bi-directional energy converter in response to the transferred energy falling below the demand level of said load and a charge level of the energy storage unit falling below a predetermined lower charge threshold.

35. The system according to claim 34, further comprising:
at least one processor programmed to deactivate said energy converter when said power level of said produced electric energy falls below said predetermined power threshold.

36. The system according to claim 34, further comprising:
at least one processor programmed to deactivate said energy converter when said demand level of said load falls below a predetermined load threshold and a charge level of said energy storage unit is at or near a predetermined upper charge threshold.

37. The system according to claim 34, further comprising:
at least one processor programmed to discontinue delivery of said produced electric energy to said load when said demand level of said load falls below a predetermined load threshold, and to deliver said produced electric energy to said bi-directional energy converter to charge said energy storage unit when a charge level of said energy storage unit is below a predetermined charge upper threshold.

38. The system according to claim 34, further comprising:
at least one processor programmed to discontinue charging said energy storage unit when said charge level of said energy storage unit is at or above said predetermined charge upper threshold.

39. The system according to claim 34, further comprising:
at least one processor programmed to prevent delivery of said converted electric energy to said load when a charge level of said energy storage unit is below a predetermined charge lower threshold, to deliver said converted electric energy to said bi-directional energy converter to charge said energy storage unit until said charge level of said energy storage unit is above said predetermined charge lower threshold.

40. The system according to claim 34, further comprising:
at least one processor programmed to optimize said produced electric energy by adjusting an operating point of said energy recharge unit via said power transfer controller.

41. The system according to claim 34, further comprising:
at least one processor programmed to disconnect said energy storage unit when a fault is detected at said output node.

* * * * *